(12) United States Patent
Kwan et al.

(10) Patent No.: US 7,167,419 B2
(45) Date of Patent: Jan. 23, 2007

(54) BEVERAGE BREWER TIMER

(75) Inventors: David Kwan, Sai Kung (HK); David S. Felty, Eau Claire, WI (US); Joseph P. Webster, St. Charles, MO (US)

(73) Assignees: Newco Enterprises, Inc., St. Charles, MO (US); Marketing Resources International, Inc., Eau Clair, WI (US)

( * ) Notice: Subject to any disclaimer, the term of this patent is extended or adjusted under 35 U.S.C. 154(b) by 287 days.

(21) Appl. No.: 10/803,840

(22) Filed: Mar. 17, 2004

(65) Prior Publication Data

US 2005/0207282 A1    Sep. 22, 2005

(51) Int. Cl.
*G04F 8/00*    (2006.01)
*G04F 10/00*   (2006.01)

(52) U.S. Cl. .................. 368/113; 224/903; 24/489; 368/107

(58) Field of Classification Search ........... 368/10, 368/276, 316, 317, 277, 278, 309; 248/114, 248/115, 116; 224/903; 24/499, 506, 489, 24/500, 502
See application file for complete search history.

(56) References Cited

U.S. PATENT DOCUMENTS 2,551,515 A * 5/1951 Tschirf ................... 224/180
3,456,262 A * 7/1969 Coon ...................... 24/501
4,362,402 A * 12/1982 Kallinke et al. ........... 368/317
4,705,408 A * 11/1987 Jordi ...................... 368/278
5,802,677 A * 9/1998 Dorman et al. ........... 24/30.5 R
6,545,592 B2 * 4/2003 Weiner .................... 368/10
2001/0036129 A1 * 11/2001 Carr ....................... 368/109
2003/0156500 A1 * 8/2003 Popowich et al. ......... 368/316

* cited by examiner

*Primary Examiner*—Daniel J. Colilla
*Assistant Examiner*—Leo T. Hinze
(74) *Attorney, Agent, or Firm*—Paul M. Denk

(57) ABSTRACT

A timer is provided for indicating when a beverage within a beverage container is no longer fresh. The timer includes a timer body and a clip. The timer body contains electronic circuitry adapted to display a time remaining before the beverage is no longer fresh. The timer body further includes two L-shaped lugs spaced apart from one another. The clip includes two timer clamps attached to one another and a central retainer. Each timer clamp has a first end and a second end. The first end of each of the timer clamps is resiliently biased in a direction away from the other. The central retainer further includes a lug adapted to be attached to the L-shaped flanges of the timer body. The second end of the timer clamps is adapted to be easily attached to a beverage container.

13 Claims, 8 Drawing Sheets

BEVERAGE BREWER TIMER

BACKGROUND OF THE INVENTION

The invention relates to the field of electronic timers. More specifically, the invention relates to electronic timers for use for determining when a beverage, particularly brewed coffee, is no longer fresh.

In the art, timers are generally known. However, in order to identify a particular timer with a particular beverage container one has to exercise the mental capacity to associate the timers with the beverage container. This can prove particularly difficult when one is performing a variety of tasks that also require a person's attention and the number of beverage containers and timers is large. While the timers could be placed in a physical location near the beverage container, this causes problems if the beverage container is to be heated, such as in the case of coffee, or if the availability of space around the beverage container is at a minimum. Therefore, there is a need for a timer for a beverage container that can be easily associated with the beverage container such that one can easily identify when the beverage contained within the container is no longer fresh.

SUMMARY OF THE INVENTION

In a first aspect of the present invention, a timer is provided for indicating when a beverage within a beverage container is considered no longer fresh. The timer comprises a timer body and a clip. The timer body contains electronic circuitry adapted to display a time remaining before the beverage is no longer fresh. The timer body further includes two L or other shaped lugs spaced apart from one another. The clip comprises two timer clamps attached to one another and a central retainer. Each timer clamp has a first end and a second end. The first end of each of the timer clamps is resiliently biased in a direction away from the other. The central retainer further comprises a lug adapted to be attached to the L-shaped flanges of the timer body. The second end of the timer clamps are adapted to be easily attached to a beverage container, the clamps can be applied directly to the timer, as noted, and particularly can be applied to the vertical level indicator, which frequently incorporates the amount of beverage remaining within the decanter, and which normally are of tubular configuration. Thus, the timer clamp of this invention can be biased directly onto that tube, to readily display the remaining time.

In another aspect of the present invention, comprises a timer for indicating when a beverage within a beverage container is no longer fresh. The timer comprises a timer body and a clip. The timer body contains electronic circuitry adapted to display a time remaining before the beverage is no longer fresh. The clip comprises two timer clamps attached to one another and a central retainer. Each clamp has a first end and a second end. The first end of the timer clamps is resiliently biased in a direction away from one another. The second end of each of the timer clamps comprises an extension potion, a generally U-shaped clamping portion attached to the extension portion and an inwardly turned retainer portion attached to the clamping portion.

DESCRIPTION OF THE PREFERRED EMBODIMENT

Figure 1:
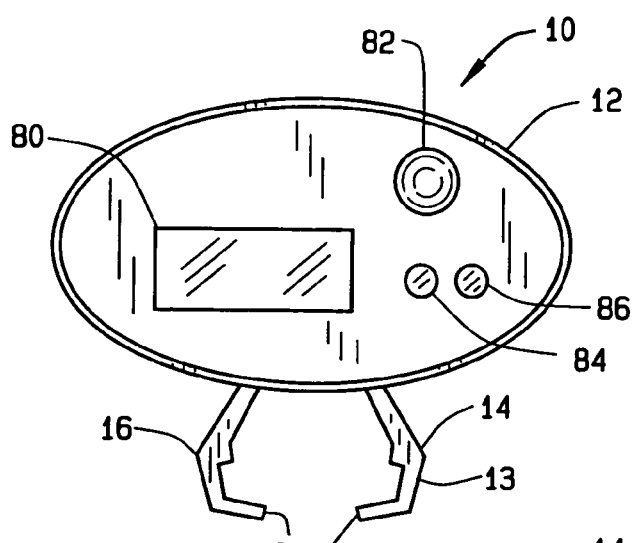
FIG. 1 is a front view of a timer according to the present invention.

While this invention is susceptible of embodiment in many different forms, and configurations, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
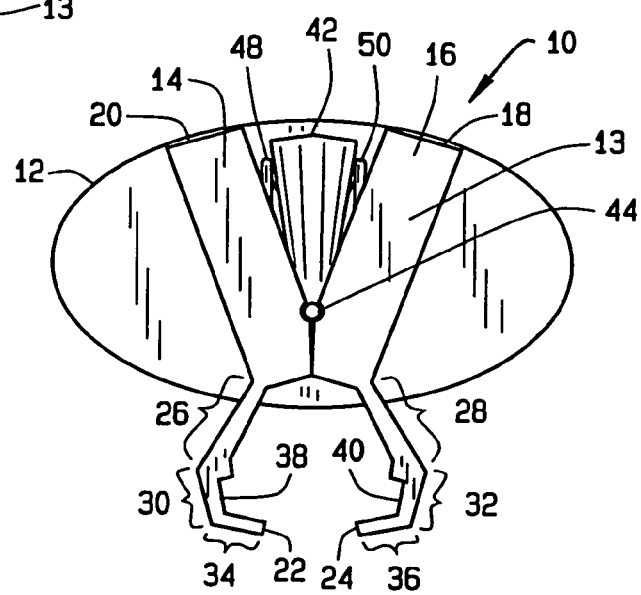
FIG. 2 is a rear view of a timer according to the present invention.
Figure 3:
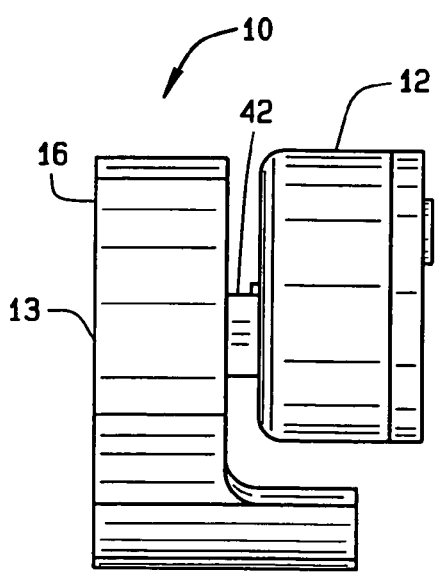
FIG. 3 is a side view of a timer according to the present invention.
Figure 4:
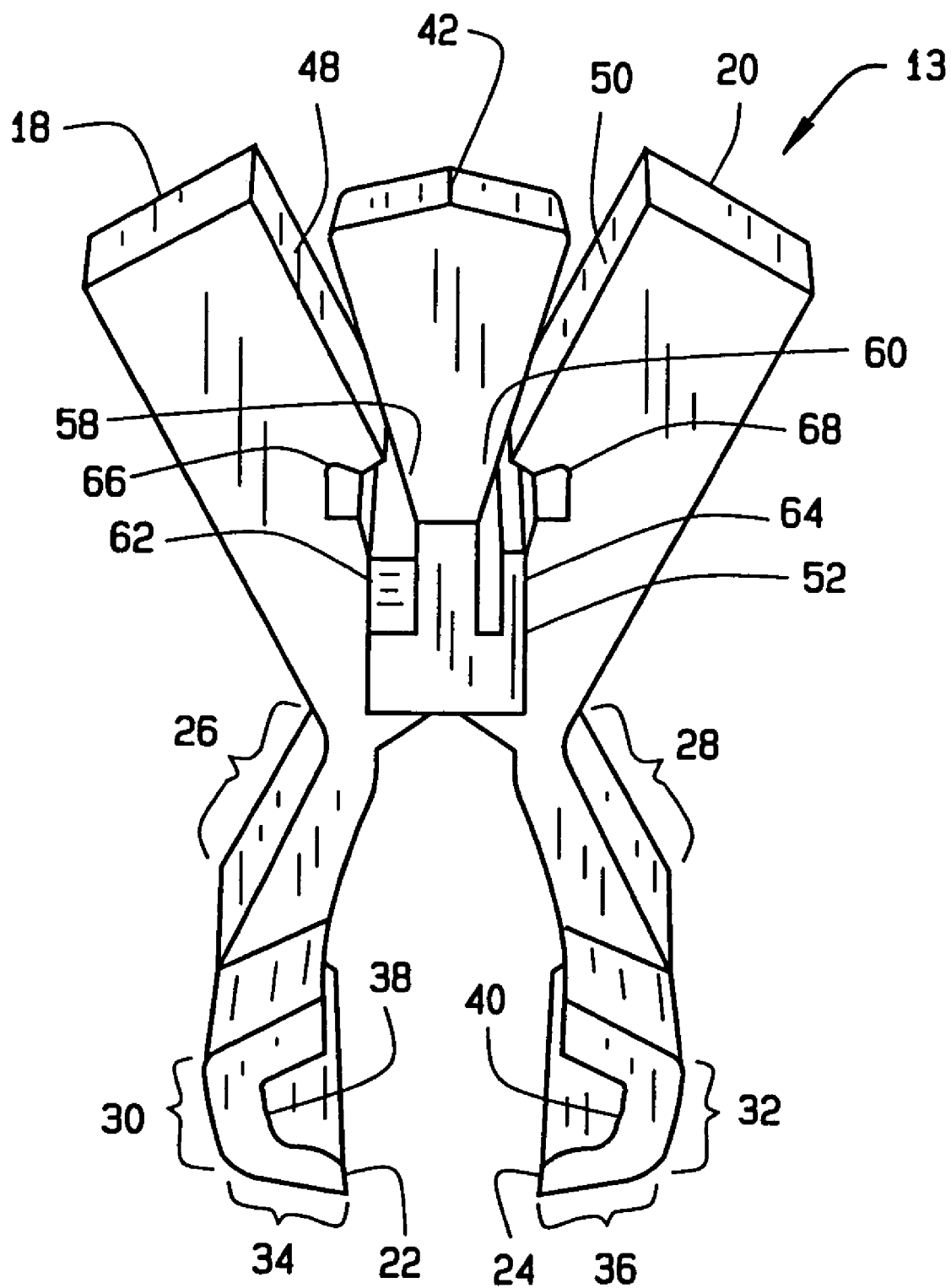
FIG. 4 is a front view of a clip for a timer according to the present invention.

Referring to FIGS. 1–3, the present invention comprises a timer 10 comprising a timer body 12 and a clip 13 comprising pair of timer clamps 14, 16. Referring to FIGS. 2 and 4, the timer clamps 14, 16 each comprise a first end 18, 20 and second end 22, 24. Each second end 22, 24 comprises an extension portion 26, 28 attached to each first end 14, 16. Attached to each extension portion 26, 28 is a generally U-shaped clamping portion 30, 32. Finally, attached to each clamping portion 30, 32 is an inwardly formed retainer portion 34, 36. Each clamping portion 30, 32 defines an attachment surface 38, 40 which is formed to fit the handle of a beverage container, particularly a coffee pot. As can be seen in FIG. 3, the clamping portion 30, 32 and the retainer portion 34, 36 are elongated with respect to the remaining portions of the timer clamps 14, 16.

Figure 5:
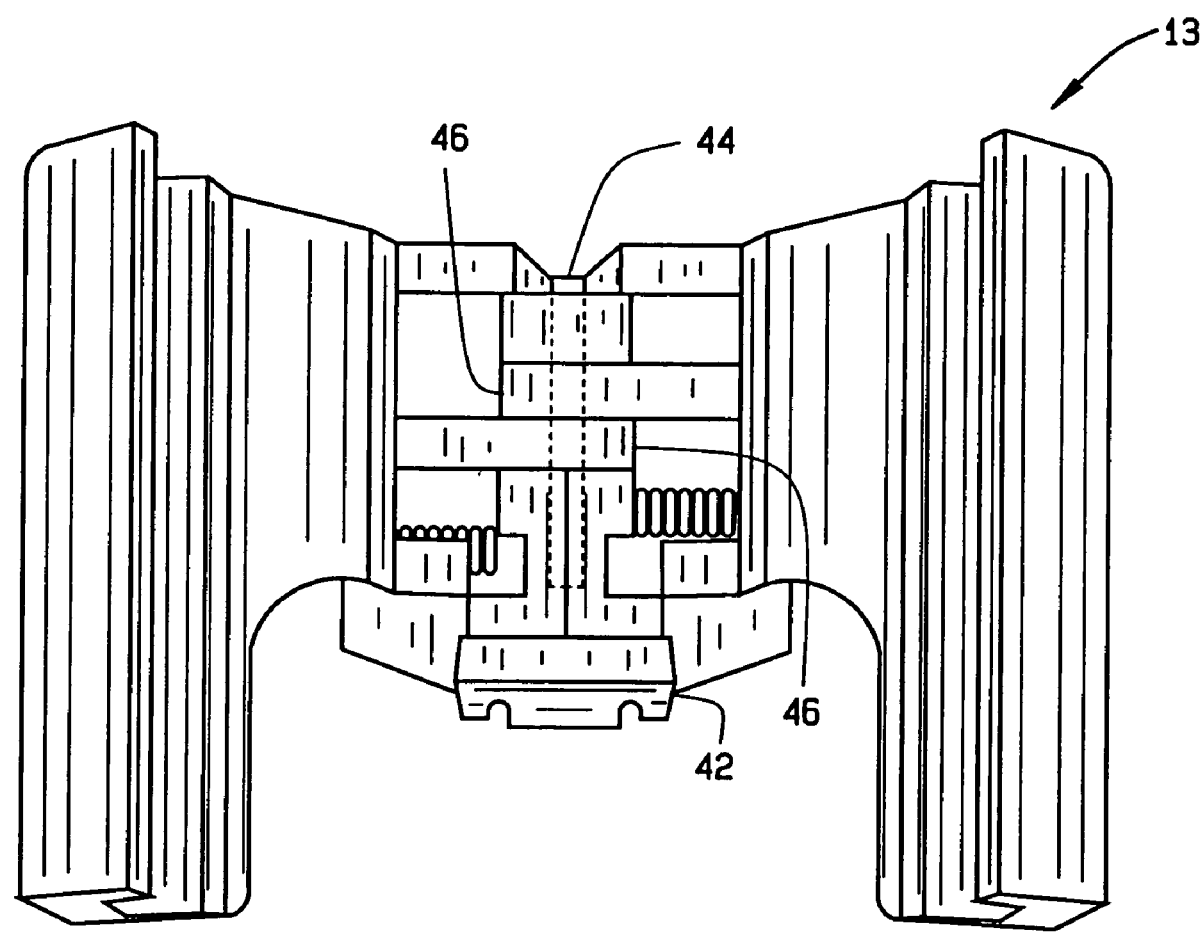
FIG. 5 is a bottom view of a clip for a timer according to the present invention.

Referring to FIGS. 2, 4 and 5, a central retainer 42 attached to the timer body 12 employs an attachment pin 44 to retain the timer clamps 14, 16 to the central retainer 42. The pin 44 extends through interdigitated flanges 46 alternately extending from the timer clamps 14, 16. As a result, the timer clamps 14, 16 are rotatingly mounted about the pin 44 to the central retainer 42. The timer clamps 14, 16 are resiliently biased by springs 48, 50 such that the second ends 22, 24 of the clamps 14, 16 are biased toward one another.

Figure 6:
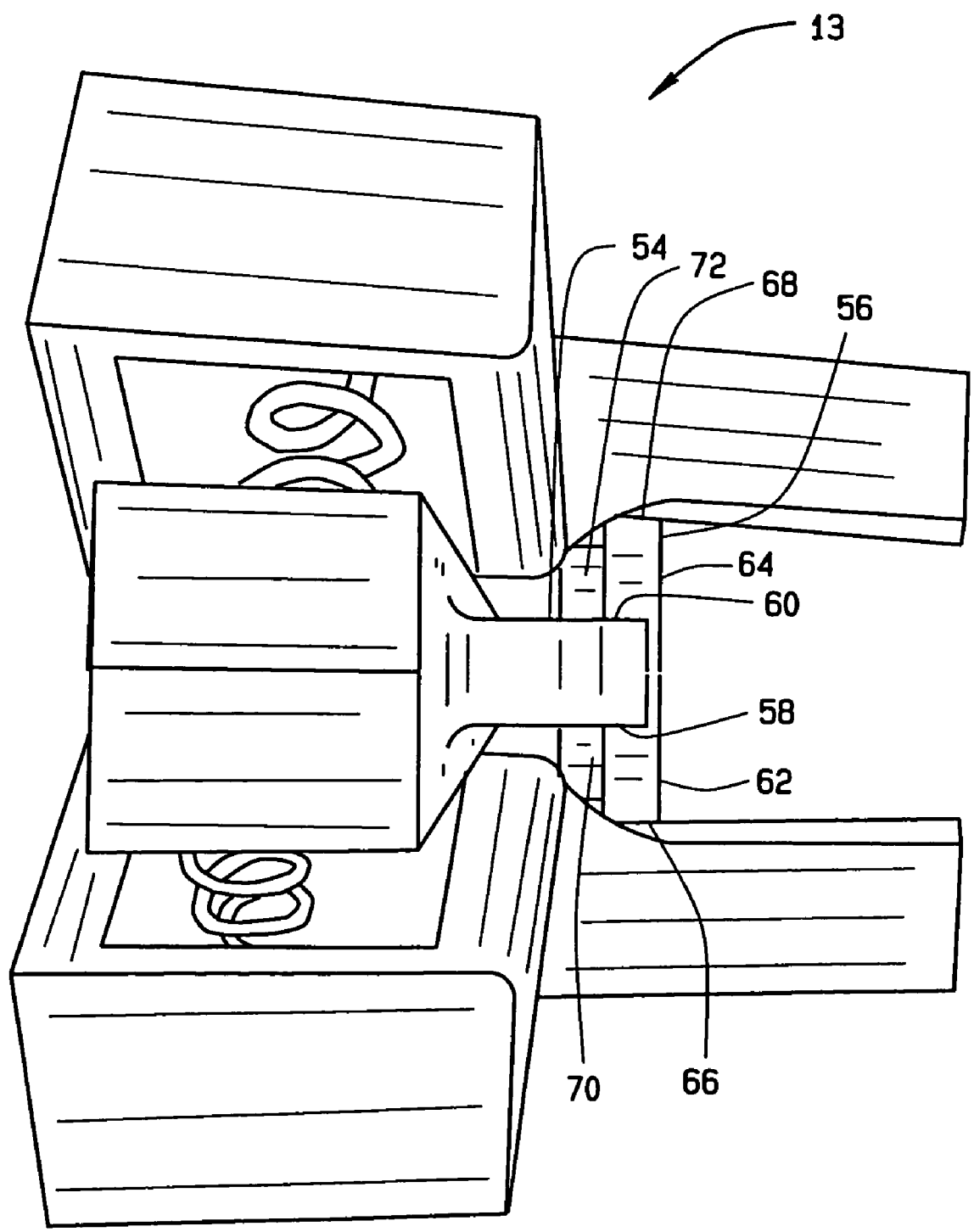
FIG. 6 is a top view of a clip for a timer according to the present invention.
Figure 7:
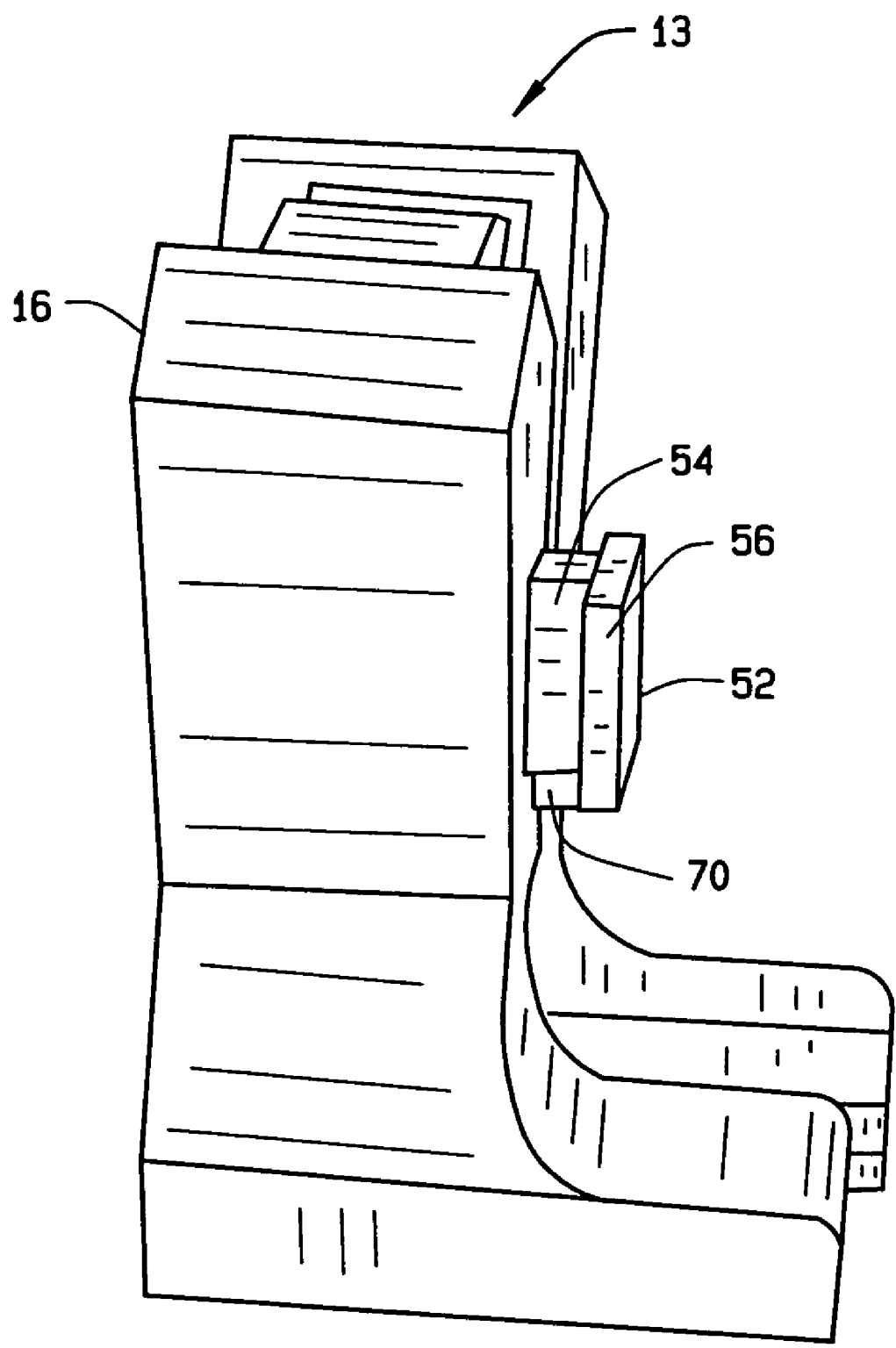
FIG. 7 is a side view of a clip for a timer according to the present invention.

Referring to FIGS. 4, 6 and 7, attached to the central retainer 42 is a lug 52. The lug 52 extends from a side of the central retainer 42 adjacent the timer body 12. The lug 52 comprises a narrowed portion 54 and a widened portion 56. The widened portion 56 defines two slits 58, 60 to create two resilient legs 62, 64 having outwardly extending feet 66, 68. Furthermore, the central retainer 42 comprises two stops 79, 72 attached to the narrowed portion 54.

Figure 8:
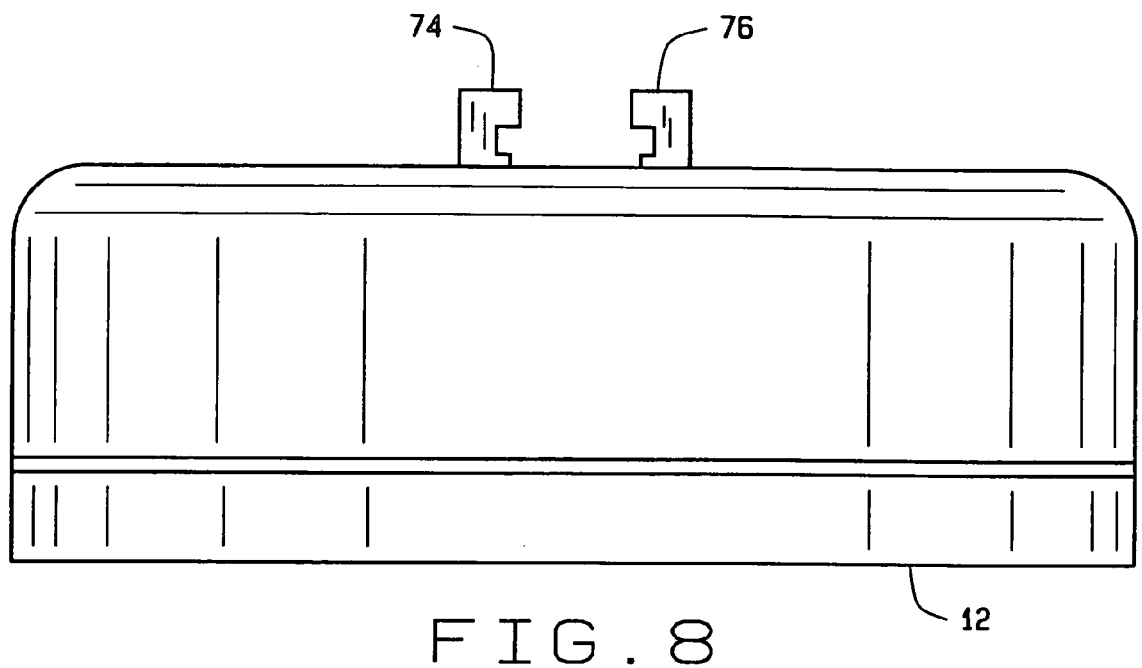
FIG. 8 is a top view of a timer body for a timer according to the present invention.
Figure 9:
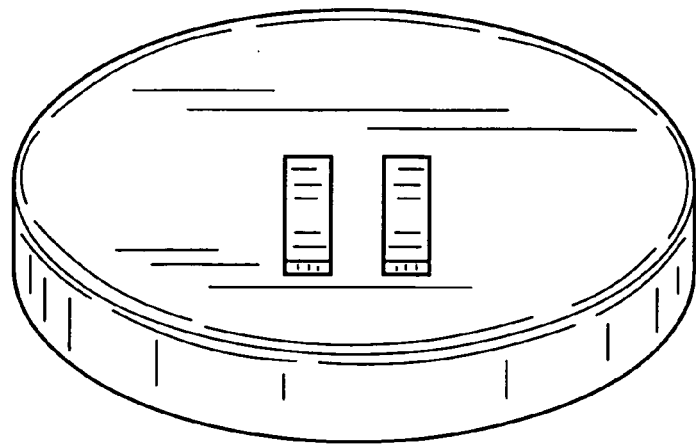
FIG. 9 is a rear view of a timer body for a timer according to the present invention.
Figure 10:
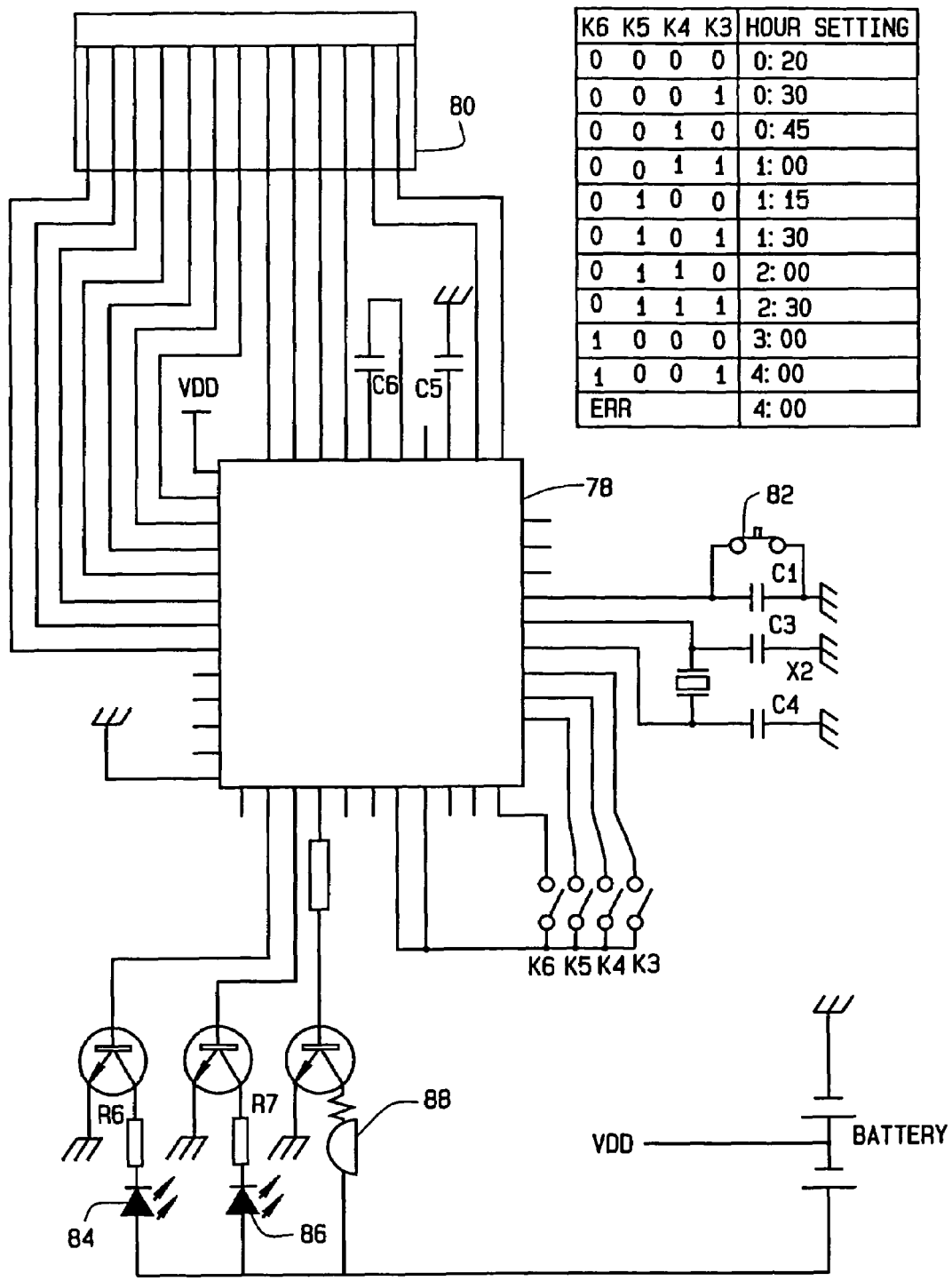
FIG. 10 is a circuit diagram of a timer according to the present invention.

Referring to FIGS. 8 and 9, a rear portion of the timer body 12 comprises two L-shaped flanges 74, 76. Referring to FIG. 10, an electronic circuit for performing the timer function is housed within the timer body 12. The circuit generally comprises an LCD control chip including a timer function 78, an LCD display 80, a reset switch 82 two LED lights 84, 86, and a buzzer 88. Other parts which make up the electrical circuit can be readily identified and understood by one of ordinary skill in the art.

DIP switches K3 through K6 can be set to vary the time from which the timer counts down.

| K6 | K5 | K4 | K3 | Countdown Time (hrs) |
|---|---|---|---|---|
| 0 | 0 | 0 | 0 | 0:20 |
| 0 | 0 | 0 | 1 | 0:30 |
| 0 | 0 | 1 | 0 | 0:45 |
| 0 | 0 | 1 | 1 | 1:00 |
| 0 | 1 | 0 | 0 | 1:15 |
| 0 | 1 | 0 | 1 | 1:30 |
| 0 | 1 | 1 | 0 | 2:00 |
| 0 | 1 | 1 | 1 | 2:30 |
| 1 | 0 | 0 | 0 | 3:00 |
| 1 | 0 | 0 | 1 | 4:00 |

Figure 11:
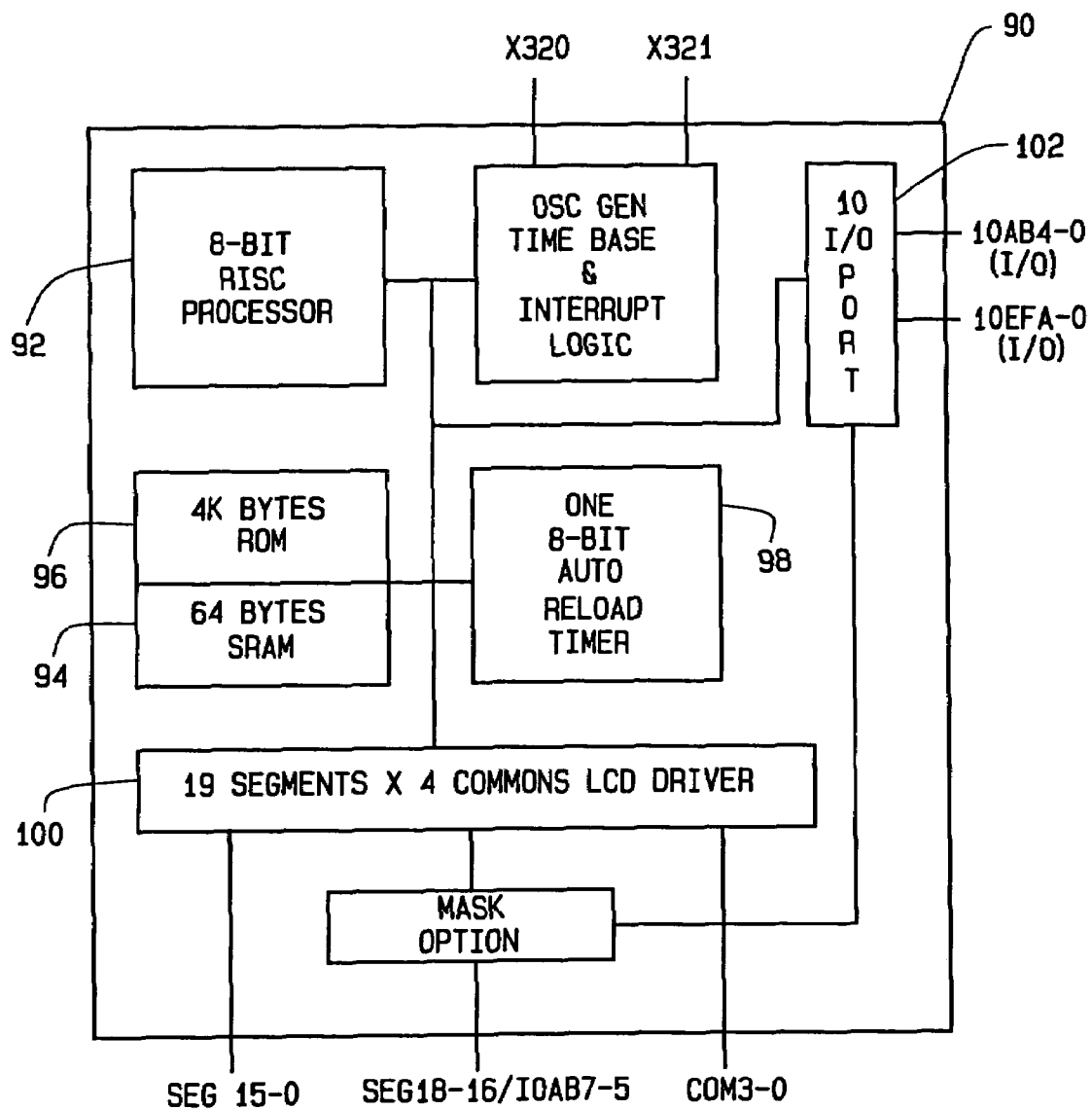
FIG. 11 is a block diagram disclosing the electronic components that are utilized in conjunction with the assembly of the beverage brewer timer of this invention.

FIG. 11 shows a block diagram, and herein furnishes a general description, for the various circuitry components that are embodied within the beverage brewer timer of this invention. As can be noted, block diagram, at 90, includes a built-in 8-bit RISC processor, at 92. The circuitry also includes a 64-byte scram processor, as at 94. It is operatively associated with a 4K-byte ROM, or read-only memory 96. A CPU frequency: 0.15–0.3 and 0.55 MHz, at 1.5 volts, is also included. The circuitry also includes a built-in RC osculater. It further includes and is operatively associated with a built-in 32.768 KHz osculater circuit for reel clock function. The circuitry includes what is identified as a watch dog mode (1 Hz or 0.5 Hz). The circuitry includes one 8-bit timer 98. The circuitry has a low operating voltage range, between 1.2 v–1.7 v. It operates off rather low stand-by current, in the stand-by mode: ISTBY>1 A. It includes an LCD matrix, for read-out purposes, which includes, for example, 19–16 segments, four commons, in configuration, as noted at 100. The circuit board includes 10 general I/O pins, identified by various segments 16, 17, 18, as defined, and as generally noted at 102. These are for connection purposes. The LCDs are generally identified as one-half, one-third bias, one-half, one-third, one-fourth duty. It provides 5 INT sources, for connection. Finally, in the power down mode, the circuitry provides a wake-up source: such as key input, 2 Hz, 16 Hz, and timer. In addition, various of the segments providing connecting points at the bottom of the shown block diagram may incorporate a mask option for the IOAB7-5. The masked option can be defined as 1 I/O for one segment. This provides a description of the block diagram, as shown in the identified figure.

Referring back to FIG. 1, viewing a front of the timer body 12, the LED's 84, 86 are visible as well as the LCD display 80 and the reset button 82.

The present invention is assembled by attaching the L-shaped flanges 74, 76 to the lug 52 of the timer body 12 by resilient deflecting the legs 62, 64 inwardly so that the feet 66, 68 will fit between the L-shaped flanges 74, 76 of the timer body 12. The timer body 12 is then positioned with respect to the lug 52 such that the L-shaped flanges 74, 76 of the timer body 12 are captured on the lug 52 between the feet 66, 68 and the stops 70, 72.

The timer 10 is operated by forcing the first ends 18, 20 of each timer clamp 14, 16 toward one another and placing the clip 13 upon a handle of a beverage container. Once the timer 10 is attached to the beverage container, the reset button 82 is depressed by the user to start a countdown function of the electrical circuit. While the timer counts down, the current time remaining is displayed upon the LCD display 80 and the green LED 84 flashes to show that the timer is active. When the timer 10 counts down to zero, the buzzer 88 is activated for a predetermined period of time and the red LED 86 is activated for a predetermined period of time. The user is thereby notified that the beverage within the container is no longer fresh and should be discarded.

It is claimed:

1. A timer for indicating when a beverage within a beverage container is no longer fresh comprising:
    a timer body containing electronic circuitry adapted to display a time remaining before the beverage is no longer fresh, the timer body including two L-shaped flanges spaced apart from one another;
    a clip comprising two timer clamps attached to one another and a central retainer, each timer clamp having a first end and a second end, the first end of each of the timer clamps being resiliently biased in a direction away from the other, the central retainer further comprising a lug adapted to be attached to the L-shaped flanges of the timer body and wherein the second end of the timer clamps are adapted to be easily attached to a beverage container.

2. The timer of claim 1 wherein the second end of each of the timer clamps comprises an extension potion, a generally U-shaped clamping portion attached to the extension portion and an inwardly turned retainer portion attached to the clamping portion.

3. The timer of claim 2 wherein the clamping portion and the retainer portion are elongated with respect to a remaining portion of the timer clamps.

4. The timer of claim 1 wherein said timer incorporates a countdown timer, and a first LED for indicating when the countdown timer is active and a second LED for indicating when the timer has elapsed.

5. The timer of claim 1 wherein the timer further comprises a buzzer for indicating when the timer has elapsed.

6. The timer of claim 1 wherein the timer further comprises a reset button for resetting a timer countdown time.

7. The timer of claim 1 wherein the timer has DIP switches for modifying the countdown time of the timer.

8. A timer for indicating when a beverage within a beverage container is no longer fresh comprising:
    a timer body containing electronic circuitry adapted to display a time remaining before the beverage is no longer fresh;
    a clip comprising two timer clamps attached to one another and a central retainer, each clamp having a first end and a second end, wherein the first end of the timer clamps are resiliently biased in a direction away from one another, wherein the second end of each of the timer clamps comprises an extension portion, a generally U-shaped clamping portion attached to the extension portion and an inwardly turned retainer portion attached to the clamping portion; and
    said timer body further comprises two L-shaped flanges spaced apart from one another and a central retainer further comprises a lug adapted to be attached to the L-shaped flanges of the timer body.

9. The timer of claim 8 wherein the clamping portion and the retainer portion are elongated with respect to a remaining portion of the timer clamps.

10. The timer of claim 8 wherein said timer incorporates a countdown timer, and a first LED for indicating when the countdown timer is active and a second LED for indicating when the timer has elapsed.

11. The timer of claim 10 wherein the timer further comprises a buzzer for indicating when the timer has elapsed.

12. The timer of claim 10 wherein the timer further comprises a reset button for resetting the timer.

13. The timer of claim 10 wherein the timer further comprises DIP switches for modifying the countdown time of the timer.

* * * * *